(12) United States Patent
Curtis et al.

(10) Patent No.: US 7,761,283 B1
(45) Date of Patent: Jul. 20, 2010

(54) VIRTUAL EPROM SIMULATOR APPARATUS

(75) Inventors: Keith E. Curtis, Henderson, NV (US);
Eugene T. Bond, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 09/720,570

(22) PCT Filed: Jun. 24, 1999
(Under 37 CFR 1.47)

(86) PCT No.: PCT/AU99/00511

§ 371 (c)(1),
(2), (4) Date: Dec. 23, 2004

(87) PCT Pub. No.: WO99/67721

PCT Pub. Date: Dec. 29, 1999

(51) Int. Cl.
*G06G 7/48* (2006.01)
*A63F 9/24* (2006.01)
*G06F 9/455* (2006.01)
*G06F 9/44* (2006.01)
*G06F 9/445* (2006.01)

(52) U.S. Cl. .............................. 703/23; 463/1; 463/29; 902/23; 718/1; 717/134; 717/170

(58) Field of Classification Search .................. 703/23; 463/1, 29; 902/23; 711/102, 103, 163; 718/1; 717/134, 170
See application file for complete search history.

(56) References Cited

U.S. PATENT DOCUMENTS

| 5,003,507 | A | * | 3/1991 | Johnson ....................... 703/28 |
| 5,070,479 | A | * | 12/1991 | Nakagawa .................... 714/11 |
| 5,643,086 | A | * | 7/1997 | Alcorn et al. .................. 463/29 |
| 5,707,286 | A | * | 1/1998 | Carlson ........................ 463/16 |
| 5,768,563 | A | * | 6/1998 | Porter et al. ................... 703/27 |
| 6,620,047 | B1 | * | 9/2003 | Alcorn et al. .................. 463/37 |

FOREIGN PATENT DOCUMENTS

EP 04648112 A2 1/1992
WO WO 9965579 A1 * 12/1999

* cited by examiner

*Primary Examiner*—Paul L Rodriguez
*Assistant Examiner*—Nithya Janakiraman
(74) *Attorney, Agent, or Firm*—McAndrews, Held & Malloy, Ltd.

(57) ABSTRACT

An apparatus for simulating the internal configuration of industry standard ROM and EPROM-type chips using other types of storage technologies, while still operating transparently with interfaces and mechanisms such as authentication devices adapted to EPROM-type media. The invention includes: an EPROM connector interface, a data presentation program; user access log display program; a user login/registration program; a software/data library; software/data selection program; and software/data loader program. These components work in conjunction to securely retrieve software images resident in mass storage media and to present them to an authentication device as if the images were resident in EPROM type media. The invention is particularly adapted to use in the gaming industry where regulation and fraud detection are performed using EPROM authentication techniques.

4 Claims, 6 Drawing Sheets

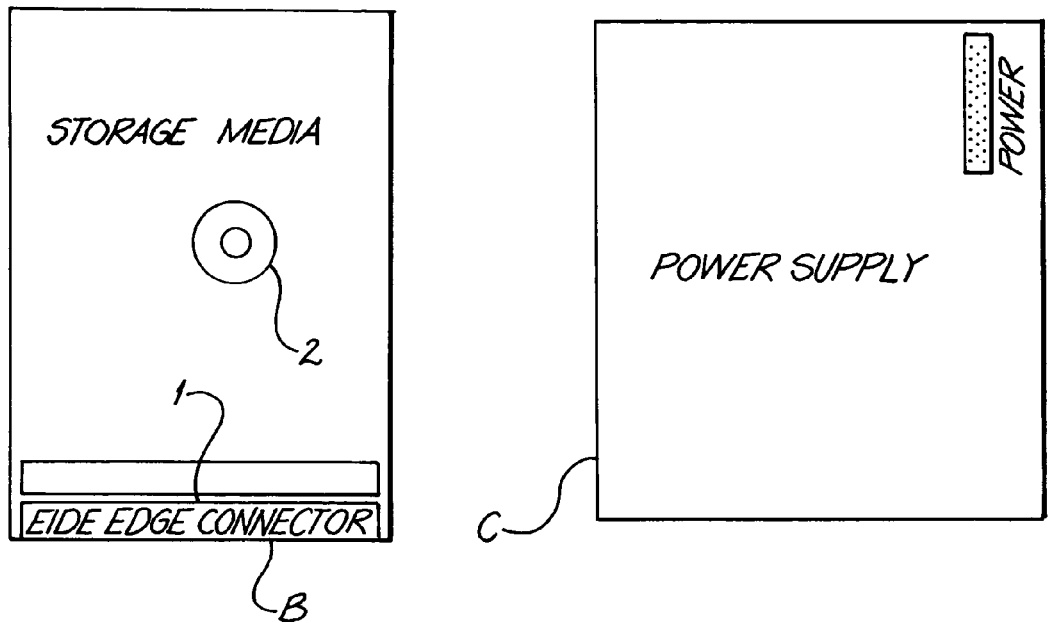
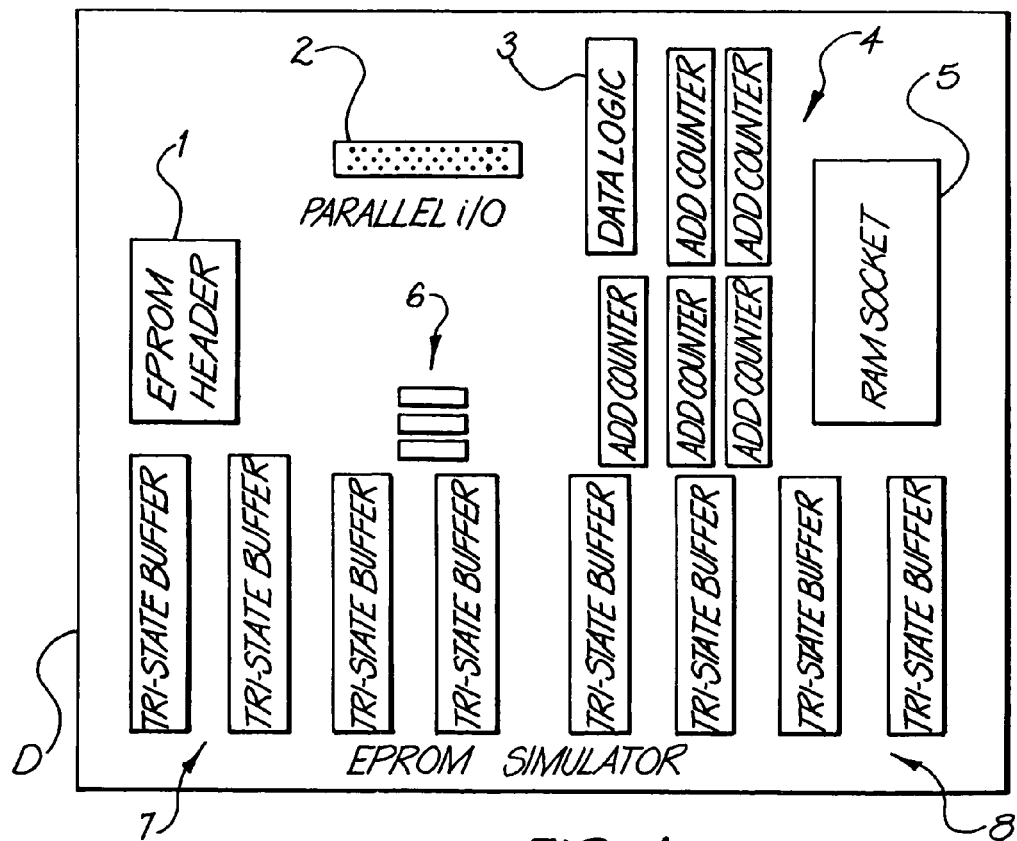
CONT. FIG. 1

Data download protocol,

1. STROBE is pulled high and AUTO FEED is pulled low
2. INIT is then pulled low, (this enables the down load mode and resets the address to 0000)
3. Data for the current address is placed on the DATA lines
4. STROBE is then pulled low then high, (this will write the data into the pod ram)
5. AUTO FEED is then pulled high then low, (this will increment the counter to the next address)
6. Steps 3-5 are then repeated for each byte in the emulator
7. When data transfer is complete INIT must be returned high.

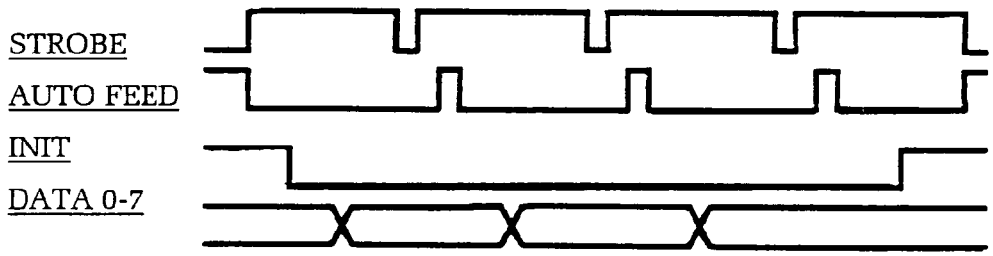

Figure 3 - Download Timing Diagram

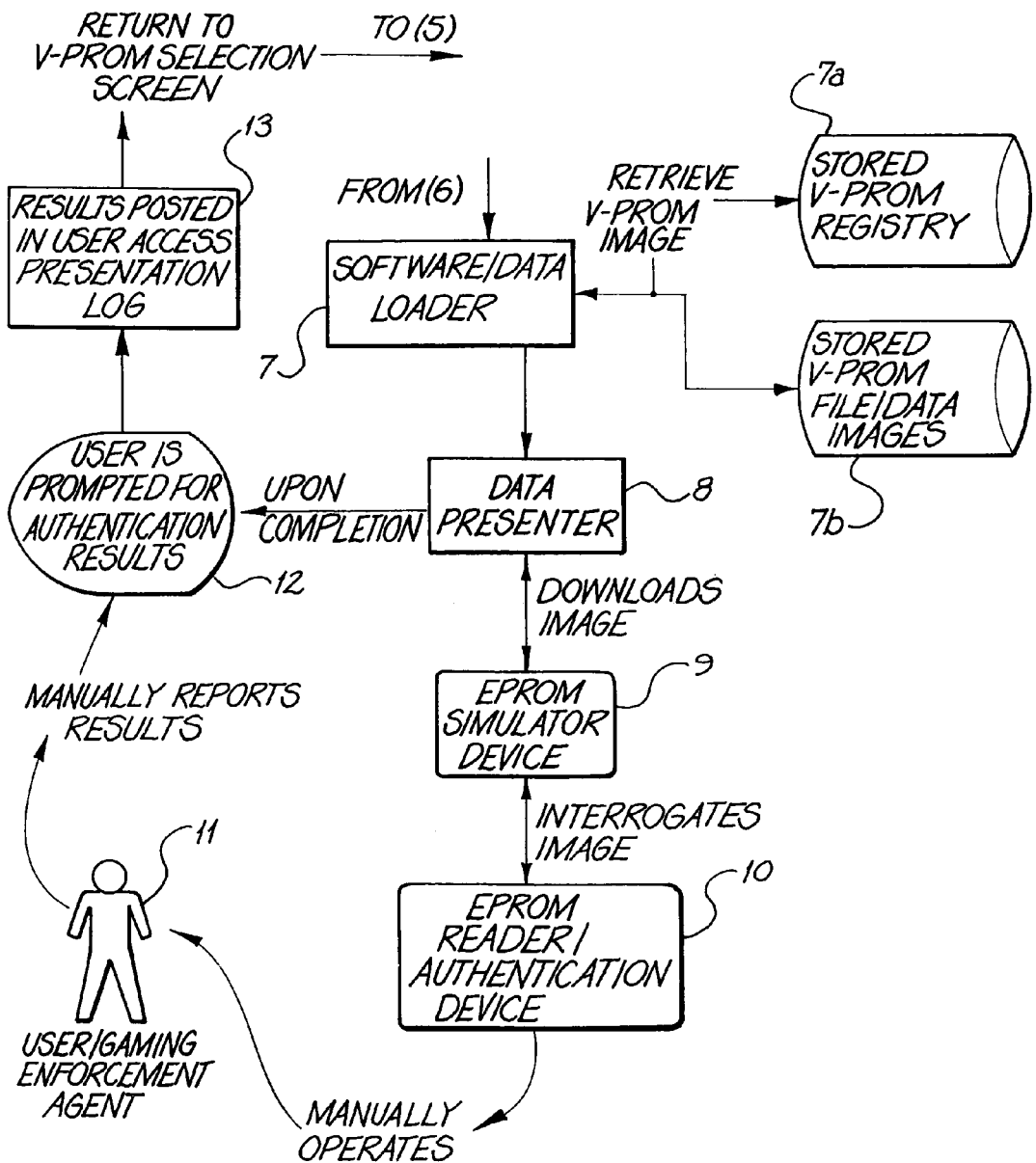
CONT. FIG. 4

VIRTUAL EPROM SIMULATOR APPARATUS

INTRODUCTION

This invention relates to the technology of non-volatile memory components commonly known as read-only memory ("ROM"), programmable ROM ("PROM"), and erasable PROM ("EPROM") integrated circuit ("IC") chips. Hereafter, the term "EPROM" will be used to refer to this category of ICs collectively. The present invention is concerned in particular with how to utilize other storage media with various interfaces adapted to the current configuration of standard, commercially available EPROMs.

EPROMs provide circuit designers and computer-based product manufacturers a compact, convenient means of storing programs and data on a single board and, often, single chip. Using EPROMs, products executing relatively static and compact stored programs may be engineered without resort to bulkier storage technologies such as fixed drives, CD-ROMs or diskettes. On the other hand, devices specifically designed for EPROM retrieval are not readily adaptable to retrieve code and data from other storage technologies, when additional capacity and/or newer storage technologies may become desirable.

While highly reliable with minimal mean time between failures, a known disadvantage of EPROMs is that they incur more intermittent and permanent retrieval errors than other kinds of memories such as RAM ICs. For example, the stored contents of an EPROM may degrade over time resulting in state changes to one or more bits. Apparent or intermittent errors may result from synchronization faults occasioned by the generally slower access times of EPROMs compared with faster random access memory (RAM)-type memories. Accordingly, one important category of EPROM interfaces consists of testing devices which rely on the present internal configuration of EPROM chips in order to analyze and verify the integrity of their stored data. Numerous other devices, boards and types of interfaces depend on EPROMs as these are presently configured. The present invention utilizes other storage media while emulating EPROMs for purposes of such devices.

BACKGROUND OF THE INVENTION

The present invention is particularly adapted to the field of casino gaming devices which house one or more games on internal EPROMs. Such devices include what are commonly known as slot machines, video poker machines, and more recent implementations that have combined both and may offer a variety of games on a single machine, referred to as a "multi-game." EPROMs employed in gaming applications are naturally subjected to the inherent limitations and potential faults of EPROMs in any other computer-based apparatus. However, the gaming industry fosters other reasons for assuring the integrity of EPROM contents: regulatory compliance and, due to the possibility of instant pecuniary gain or loss, detecting and thwarting cheaters who could benefit from purposely altered software or payout tables.

In jurisdictions where gaming is permitted, use of such devices is regulated by law. Consequently, in regulated jurisdictions gaming devices are routinely, regularly and randomly verified by the authorities to ensure the compliance, integrity and authenticity of their EPROMs. The present invention is particularly designed to aid in complying with gaming regulations requiring an EPROM-based method for determining the authenticity of the device. A commonly configured multi-game machine would include a number of games such as: keno, poker, slots, blackjack and others. These games can be played separately or be combined into new games, games within games, pushing the limits of software and hardware. Typical gaming machines of this type also employ a combination of mechanical devices, electronics, microprocessors and complex software to generate the gaming experience. Some of the common hardware components used are as follows: a cabinet, handle, jackpot tower, coin acceptor, bill acceptor, credit meters, back-lit glass, reels, monitor, game door, buttons, payout hopper, lights and speakers. The electronics include many of the following components: microprocessor, read only memory (ROM), RAM, high speed data bus, peripheral logic chips for serial and parallel ports, driver circuitry for lamps, speakers, video and other devices. Typical software components would include: power-up initialization, device drivers, game recovery, state machine, random number generator, payout routine, credit management, graphics engine, sound, game engine, game data, security, accounting and reporting functions. As a result, the increasing complexity of such gaming devices commensurately increases the difficulty of ensuring EPROM integrity as well as regulatory compliance.

Software authentication is usually a process carried out by a third party (other than the manufacturer or the casino operator) representing the gaming enforcement agency that has jurisdiction over the device. The purpose is to ensure that the software controlling the game has not been tampered with, and software authentication is usually required after a large jackpot has been obtained by a player. Authentication also verifies that the gaming software was previously examined and approved by the gaming agency in whose jurisdiction the jackpot occurred. Moreover, casinos wish to verify that the software running the game is legitimate, particularly if a particular machine is not earning the expected amount of revenue, or in response to player complaints about the behavior of a particular game.

DISADVANTAGES OF PRIOR ART SOLUTIONS

In prior art devices, authentication is usually accomplished by one of two methods. Both methods require opening of the game, removal of the CPU and removal of EPROMs containing the software. In the first method, the removed EPROMs are compared, using an industry standard EPROM programmer/reader, with a custodial (or master) set of EPROMs which have been kept in a secure location. If the comparison indicates that they are the same, the software is considered to be authentic. The second method involves plugging each EPROM into an electronic authentication device, for example a widely used proprietary device marketed under the trade name Kobitron, which generates an authentication identification (ID) for the image resident in the EPROM. The resulting authentication IDS are compared to previously recorded IDs for those EPROMs. If they are identical, the software is verified as authentic.

These methods are common to the gaming industry, but they only apply to software stored in EPROM-style media. U.S. Pat. No. 5,643,086 (Alcorn et al.), assigned to a corporate manufacturer of multi-game devices, discloses an apparatus for authenticating software stored using media other than EPROMs, such as a hard drive. However, in the Alcorn apparatus, the software inspects itself and renders a verdict as to its own authenticity. Self-verification and the potential for compromised security at the point of manufacture render the Alcorn technique a generally unacceptable practice in the gaming industry. In addition, Alcorn's apparatus cannot be used with a Kobitron, upon which regulators and owners have come to rely.

Bond et al., the present inventors, disclosed in a patent application entitled "Software Authentication Control System," U.S. Ser. No. 60/089,654, filed 17 Jun. 1998, a method for authenticating software stored in non-EPROM-type media that is consistent with accepted practice. A limitation of this disclosure, however, is that it is also not backwards compatible (at the hardware level) with present EPROM-type authentication devices.

Present authentication methods are well-suited to prior art devices which use EPROM type storage; however, new operating systems, multi-game devices, and multimedia functionality require new mass storage technologies. Storing gaming software on these technologies render present, accepted, EPROM media authentication devices and procedures useless. And though Alcorn discloses a method for 'authenticating' software stored in mass media, it ignores the existing authentication paradigm presently expected in the gaming industry. Thus, there is a need for a means of authenticating software stored in modern media that is compatible with existing gaming regulations and practices. The industry is comfortable with having a set of EPROMs for "system" software and a set for each model (comprising a unique pay schedule, symbols/graphics, and/or play rules), or a set for each game in a multi-game environment.

In brief, the industry requires a method of authentication which is in harmony with current accepted practices, compatible with current authentication hardware, but which can also avail itself of the advantages of new and future storage technologies.

DEFINITIONS

V-PROM
  Virtual programmable read-only memory. In the present invention, V-PROMs are logical containers (like file folders or directories) that contain related stored binary information (software and data). V-PROMs aid in the retrieval and management of related stored binary information by logically grouping discrete data and program entities together as if they were stored in EPROM type media.

V-PROM Registry
  A program/data directory which provides crucial information used in the management, retrieval and authentication of related programs and data sets. It is comprised of a relational database directory that was designed to store logical EPROM-like grouping information in V-PROM Registries containing the location and media type of related stored programs and data sets, each group having a unique V-PROM name of the software games to be installed for a specific application; e.g., operator/casino installation.

SUMMARY OF THE INVENTION

The present invention offers a number of advantages over prior art devices, including: backwards compatibility with existing EPROM media authentication devices; the ability to present software and data, such as gaming software, stored in non-ROM media as if it were stored in an EPROM media; added security for protecting the software/data presentation process; functionality to browse a list of all software resident on the machine as if it were in an EPROM library; functionality for selecting resident gaming software for presentation to an authentication device; functionality for registering presentation users; functionality for reporting presentation users and activities.

The present invention, from an apparatus perspective, is a control system for electronic gaming machines which is controlled with a typical microprocessor configuration, including a CPU, RAM and non-volatile storage devices such as a hard drive and/or CD-ROM, input/output interfaces, video display, operating system, power supply, and a plurality of programs and associated tables and other reference data in ROM/EPROM-type media. The ROM/EPROM includes a presentation capability for passing the program and the data to an external device, such as an authenticator, in response to an authorized user request directive. The presentation function includes a user registration program, a V-PROM library which groups related gaming software and data into the logical containers termed "V-PROMs," a V-PROM selection program, a loader program, a data presentation program. A mass storage medium, in communication with the invention control program, containing approved gaming software and related data means associated through V-PROMs is used for non-volatile storage.

The means for emulating an EPROM includes: a pseudo-EPROM memory utilizing some other storage medium, a connection between the EPROM simulator to and from the CPU, a means for addressing the pseudo EPROM memory, an input data buffer, an output data buffer, and an interface for connecting the EPROM emulation means to an industry standard EPROM reader.

From a process perspective, the V-PROM presentation function of the machine's diagnostic routines, which presents mass media based gaming software to ROM media authentication devices, is activated by a key switch operation initiated by the user (typically a gaming enforcement agent). Upon entering the V-PROM presentation screen, a log of previous presentation screen users is displayed including: usernames, date, time, type of event, V-PROMs presented/authenticated, and the date and time when then log was created. After display of the log, the user is required to register or exit the diagnostic function. To register, the user must enter a username and password. If the password does not match the previously established password for that account, a user registration error is entered into the log and the screen is automatically exited. New users, if allowed, establish their password during their first login session. Optionally, users can be pre-enrolled. If the password does match, the collected registration information is appended to the presentation users' log. After registration, the V-PROM selection screen is activated. The user may browse the entire library of V-PROMs resident on the storage media of the machine, termed V-PROM Registry Set. This information includes V-PROM names, description of related gaming software and data, version numbers, creation times and dates, statistical and marketing information. From this screen, by pressing a button, the user can "present" the currently selected V-PROM image (gaming software and related data, logically grouped) to the E-PROM emulator which then can be authenticated by a connected prior art device that is capable of reading EPROMs. After presentation, the user is required to log the results of the authenticating device's inspection. After this, the user can select another V-PROM image for presentation. When the user is finished testing V-PROMs, the screen is exited via a button press, the diagnostic function is ended and normal game play may resume. In the event of a V-PROM failing inspection, upon exiting the diagnostic function, the game enters a lock-up state which can only be cleared by a special process.

V-PROMs can also contain other V-PROMs, thus, a given software configuration can be stored as a V-PROM containing a series of 'smaller' V-PROMs which contain all of the software to be installed for a specific installation, such as a specific casino.

The V-PROM Registry Set has the added benefit of abstracting the type of storage media from the authentication process thus allowing for the use of a wider variety of storage media. For more detail see patent application of Curtis et al. for a Software Verification and Authentication Control System.

OBJECTS OF THE INVENTION

It is an object of the present invention to provide a device for use within a microprocessor-based device, which allows for authentication of internal data and software code stored in modern media in manner consistent with that which occurs in current EPROM-based technology.

It is another object of the present invention to provide a device for use within a gaming machine, such as a slot machine or a multi-game machine, which allows for authentication of gaming software stored in modern media in a manner consistent with that of EPROM-based prior art systems.

Still another object of the present invention is to provide a device for use within a gaming machine that allows for gaming software to be authenticated with pre-exiting means through emulating the physical characteristics of gaming software stored in EPROM-type media.

Still another object of the present invention is to provide a method for accessing/presenting gaming software stored in non-EPROM media as if it were stored in EPROM-type media.

Still another object of the present invention is to provide a method of displaying a resident library of gaming software stored in non-ROM media as if it were stored in EPROM-type media.

Still another object of the present invention is to provide a method for securing the gaming software presentation process.

Still another object of the present invention is to provide a method for registering presentation users.

Still another object of the present invention is to provide a method for reporting presentation users and activities.

Still another object of the present invention is to provide a method for selecting gaming software for presentation to an authentication device.

BRIEF DESCRIPTION OF THE DRAWINGS

The present invention is more readily understandable by reference to the following detailed description read in pari materia with the accompanying drawings in which:

FIG. 3 is a timing diagram describing the protocol for downloading to the EPROM simulator.

DETAILED DESCRIPTION OF THE PREFERRED EMBODIMENT

Figure 1:
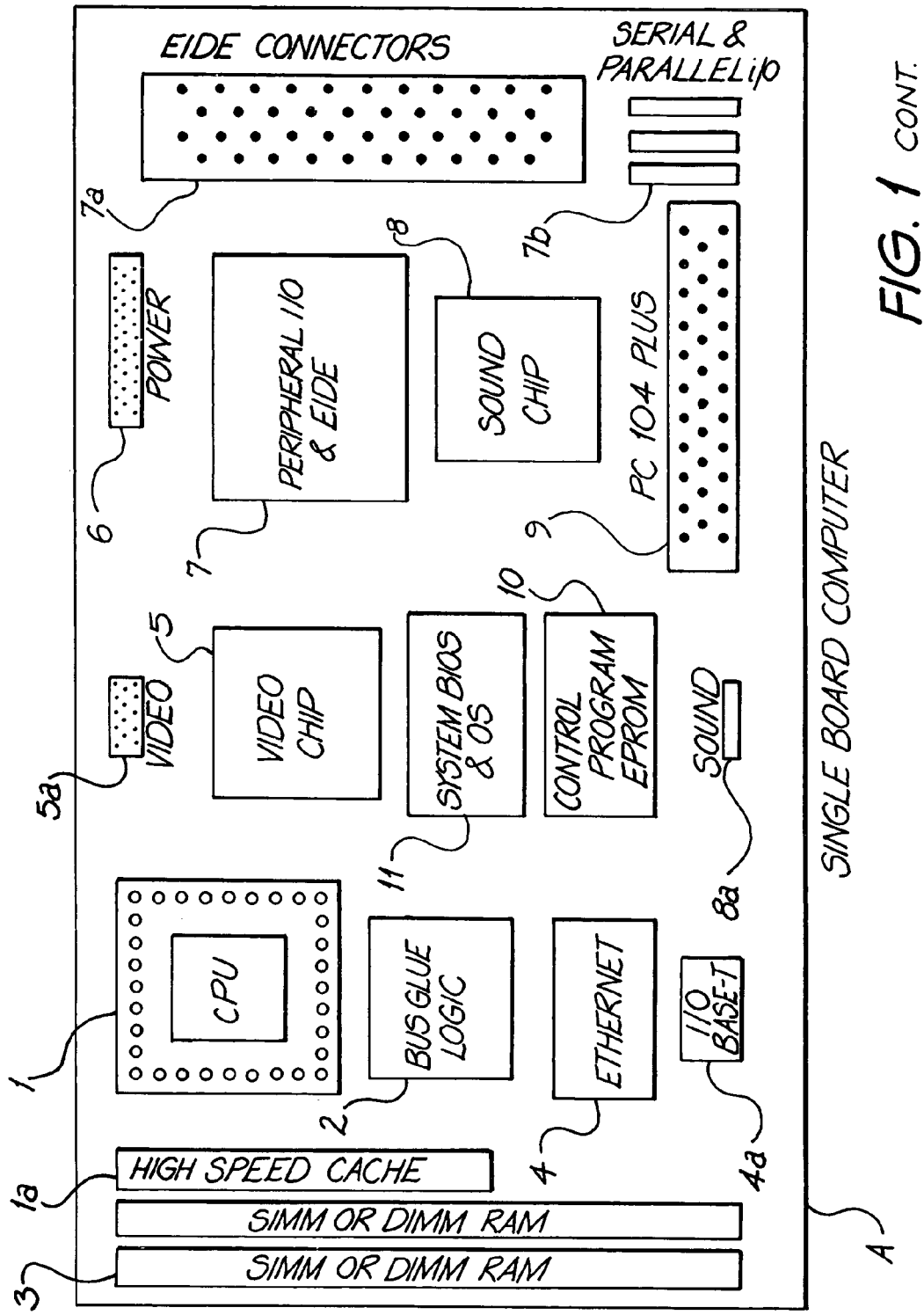
FIG. 1 is a simplified schematic diagram of the device of the present invention and related hardware components.

FIG. 1 illustrates the hardware components utilized in the preferred embodiment of this invention. Other hardware configurations are possible because of the modular nature of this design. The present invention is a control system, FIG. 1, for a gaming machine. The machine is not shown, but can be either a single game or multi-game machine.

The control system, FIG. 1, is comprised of four major modules. Module (A) is a drawing of a commercially available Single Board Computer (SBC). Module (B) is a drawing of a commercially available storage media. Module (C) represents the existence of a power supply. Module (D) represents the EPROM Simulator Board. All four components interconnect. Module (A) connects to Module (B) through the use of either an EIDE cable or SCSII cable in the case of a SCSII based SBC. Module (A) also connects to Modules (D) through a parallel I/O cable. Module (C) supplies power to the other four modules via power cables and connectors.

In detail, Module (A), the SBC, is comprised of the following components: (1) an X-86 CPU such as a Pentium™ or Pentium II™ processor with MMX™ [Pentium, Pentium II and MMX are trademarks of Intel Corp.] or equivalent technology; (1*a*) high speed processor cache for improved performance; (2) glue logic chips for driving high speed data busses and interfacing the processor to other high speed components such as RAM, video processors, network chips, and I/O boards; (3) high speed RAM sockets, typically DIMM or SIMM style. (4) integrated high speed network interface; (4*a*) network interface connector; (5) integrated high speed video processor, (5*a*) video monitor connector; (6) power connector; (7) custom peripheral I/O chip for driving serial I/O, parallel I/O; disk subsets such as EIDE or SCSII; (7*a*) EIDE or SCSII storage media connectors; (7*b*) serial and parallel I/O connectors; (8) integrated sound chip; (8*a*) sound connector; and (9) stackable PC104 Plus connector. It is important to note that this invention, due to hardware abstraction accomplished through the use of a general purpose OS, is not tied to a specific SBC or manufacturer. This invention treats the SBC as a component which can be swapped or upgraded as new boards become commercially available.

Module (B) represents the use of general purpose mass storage media. The media represented in Module (B) can include: Hard disks, CD-ROMs, solid state storage devices, or other common media used in the PC industry. This media is connected (1) to the SBC (A) through a PC industry standard interface such as EIDE, SCSII, or PCMCIA. (2) represents a drive spindle in the case where spinning media is used. Although this invention can function without mass storage, it is specifically designed to exploit the advantages of such devices.

Module (C) represents a power supply. For the most part, this supply is designed to provide the voltages and current required for using standard PC hardware.

Module (D) represents the EPROM simulator Board. This board is interfaced to the SBC via a parallel cable (not depicted) connect to (A-7*b*) and (D-2) parallel I/O connectors. This board is responsible for receiving downloaded V-PROM images, stored in RAM (5), allowing for their interrogation by an EPROM reader or Authentication Device attached to EPROM header (1). This board contains the following components: (3) a gate logic chip; (4) five digital counter chips used for addressing RAM (5); (6) three resisters used for biasing the parallel control lines—strobe, autofeed, and init (see FIG. 2); (7) four input buffer chips for RAM (5); (8) output buffer chips for RAM (5)

Figure 2:
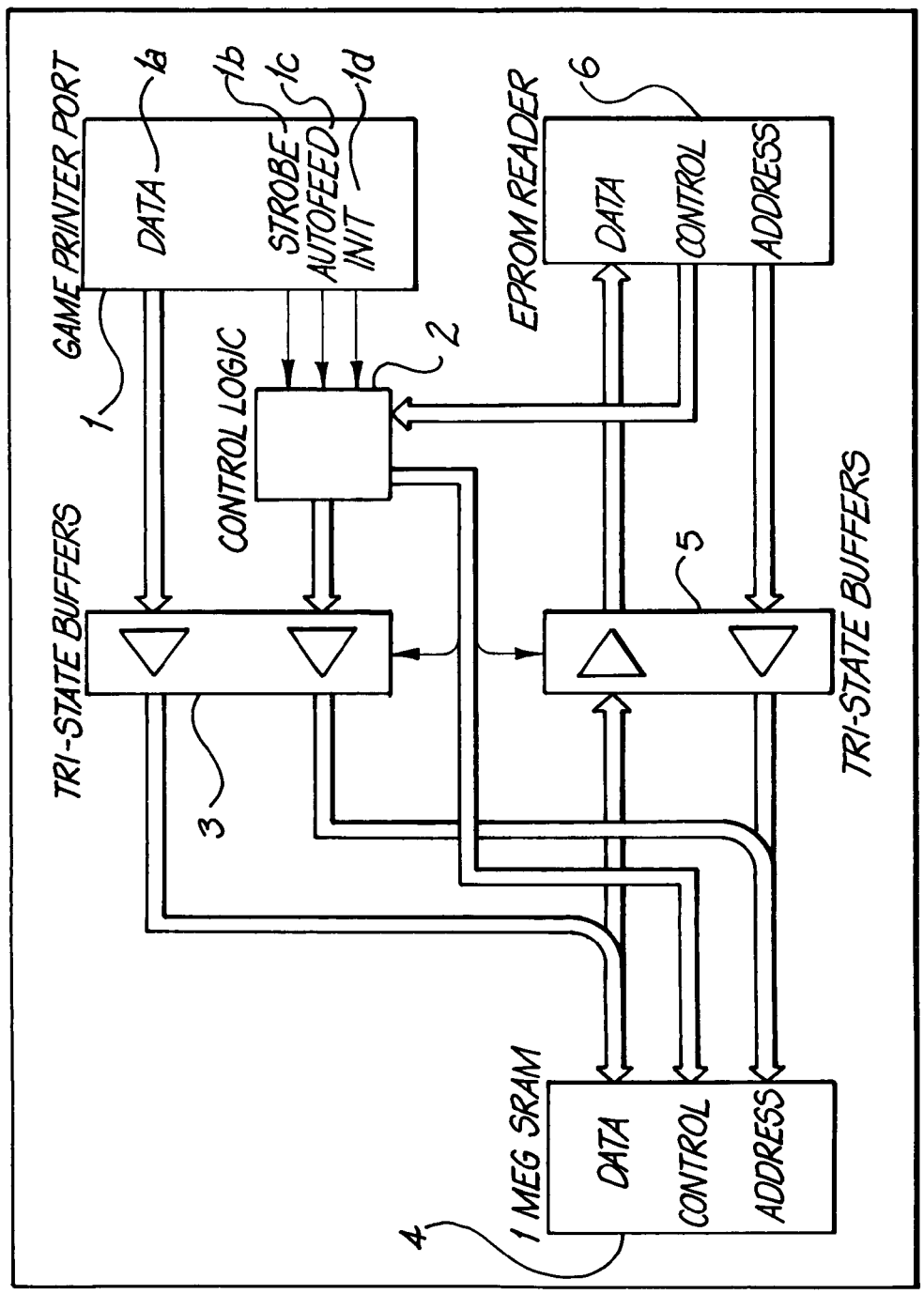
FIG. 2 is a block diagram of the EPROM Simulator component detailing process control flow.

FIG. 2 provides more detail on the control system for the EPROM Simulator module (D). FIG. 2 describes the following sub-component interactions: control logic (2), components (D-3, 4) responds to parallel I/O control lines, strobe (1*b*), autofeed (1*c*) and init (1*d*), inputs; the strobe input (1*b*)

is used to trigger the control logic to write the data (1a), supplied via the parallel I/O data lines, through the input RAM buffers (3) into the RAM chip (4); the autofeed input (1c) is used to trigger the control logic to increment the address counter; the init input (1d) is used to control access to the RAM buffers (3) either via PC or EPROM control address counter are not selected and held resent for start of next data load from PC. Following data loading and reassertion of the INIT (id) line, an EPROM reader, or Authentication Device, can read the data stored in RAM (4) through the output RAM buffers (5) as if it were reading an EPROM.

The software which controls the functioning of the present invention is stored in three different places. EPROM (FIG. 1, A-10) contains the diagnostic program for the gaming machine. Storage device (A-11) contains the BIOS and Operating System software. The media type of device (A-11) varies from SBC to SBC, in some cases the BIOS and Operating System software is stored in two separate devices. Distinct software games, and data are stored on media device (B). In some configurations, game software can be stored on a fileserver attached through the network via connector (4a).

Figure 4:
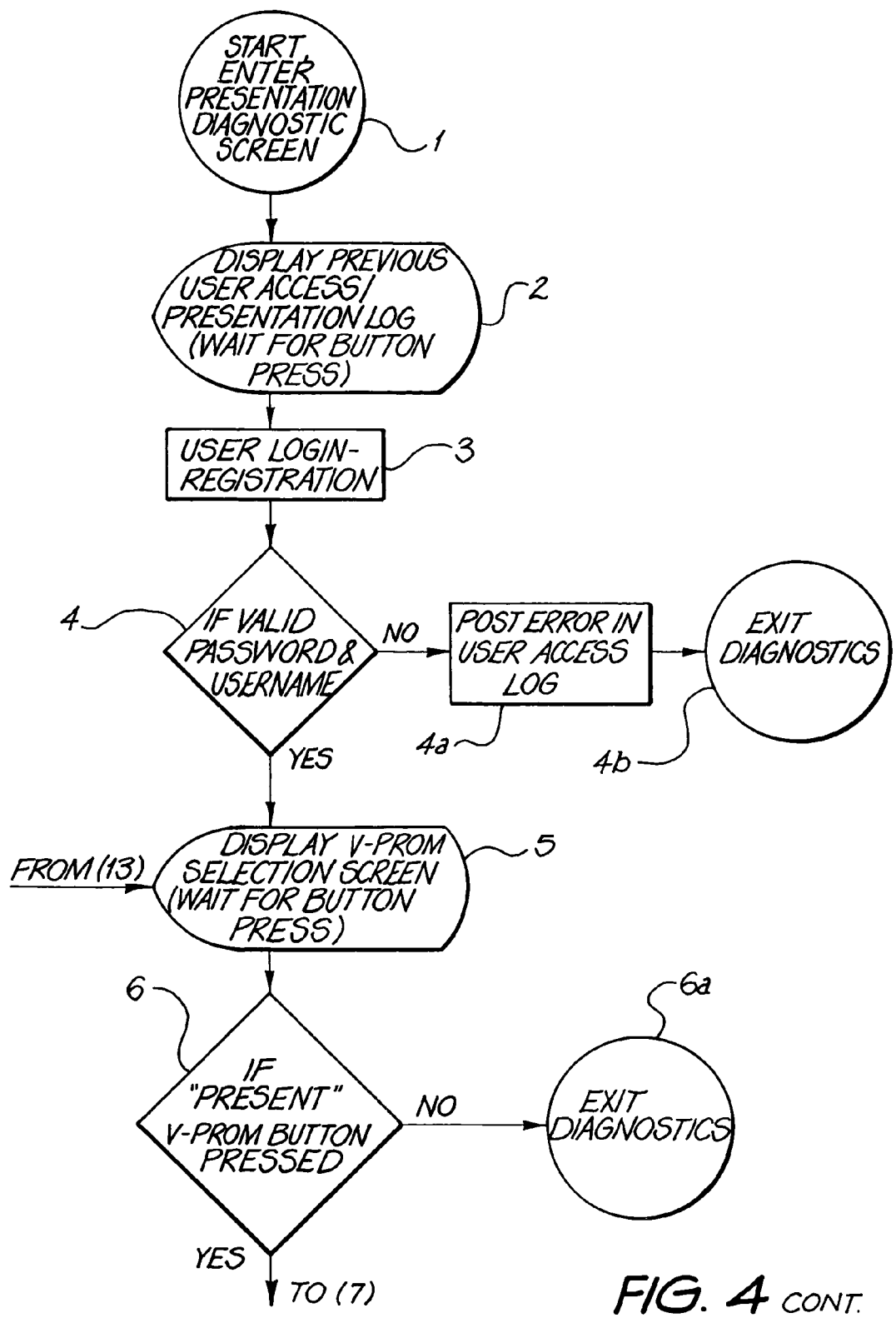
FIG. 4 is a block diagram describing the V-PROM presentation process.

The contents of EPROM (FIG. 1, A-10) contains the following software components illustrated in FIG. 4: diagnostic routines; V-PROM Presentation program (9); user access log presentation program (2); user login/registration program (3); V-PROM Library and selection program (5); and software data loader program (7). V-PROMs are stored in non-volatile storage (B). The V-PROM Registry is stored in secure non-volatile storage not depicted.

FIG. 4 details the flow of control during the V-PROM presentation process and is described in the following paragraph. The machines diagnostic routines are triggered by a user via a key switch. Diagnostic routines are selected according to the number of consecutive key switches initiated by the user. Among these diagnostic routines is the V-PROM Presentation Program (1), FIG. 4. Upon entering the V-PROM Presentation screen, a log of previous presentation screen users is displayed (2) including: usernames, date, time, type of event, V-PROMS presented/authenticated, and the date and time when then log was created. After display of the log, the user is required to register or exit the diagnostic function (2). To register, the user must enter a username and password (3). If the password does not match (4) the previously established password for that account, a user registration error is entered into the log (4a) and the screen is automatically exited (4b). New users, if allowed, establish their password during their first login session, not depicted. Optionally, users can be pre-enrolled, not depicted. If the password does match, the collected registration information is appended to the presentation users' log, not depicted. After registration, the V-PROM selection screen is activated (5). The user may browse the entire V-PROM registry (7a) library of V-PROMS resident on the storage media (7b) of the machine. This information includes V-PROM names, description of related gaming software and data, version numbers, creation times and dates, statistical and marketing information. From this screen (5), by pressing a button (6), the user can download the selected image to the EPROM emulator (9). To do this, the V-PROM browsing program (5) invokes the loader program (6) passing it the name of the selected V-PROM. The loader retrieves the image (7b) referencing the registry (7a), and calls the data presenter (8) which subsequently downloads the image to the EPROM simulator (9). The user (11) connects a prior art device that is capable of reading/authenticating EPROMS. This device (10) authenticates the downloaded V-PROM image. After presentation (8), the user (11) is required to enter the results of the authenticating device's inspection (12). After this, the user can select another V-PROM image for presentation (5). When the user is finished testing V-PROMS, the screen is exited via a button press (6), the diagnostic function is ended (6a) and normal game play may resume. In the event of a V-PROM failing inspection, upon exiting the diagnostic function, the game enters a lock-up state which can only be cleared by a special process, not depicted.

FIG. 3 illustrates the protocol that is used to download data to the EPROM simulator. The data is communicated via a parallel I/O cable. The data is synchronously clocked into the simulator by pulsing the strobe line. The destination address is incremented by the autofeed line. The init line is used to reset the destination address counter to zero.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. In an electronic gaming machine having (1) game software stored in a non-EPROM storage media in the form of V-PROMs, and (2) an EPROM emulator, a method for verifying the stored game software using an external EPROM reader, the method comprising:
   providing on a browsing access screen a plurality of V-PROMs resident on the storage media of the gaming machine;
   selecting a V-PROM;
   downloading the selected V-PROM to an EPROM emulator;
   connecting an external EPROM reader to the EPROM emulator; and
   verifying the selected V-PROM at the external EPROM reader,
   wherein downloading the selected V-PROM comprises downloading information of the selected V-PROM to the EPROM emulator, and
   wherein the information of the selected V-PROM comprises a V-PROM name, a description of a stored game software and data, a version number of the stored game software and data, statistical and marketing information of the stored game software and data.

2. The method according to claim 1 and further including: generating a presentation screen showing a user log; and receiving a user registration prior to providing a selection screen.

3. The method of claim 1 comprising restricting access to the selection of V-PROMs to an authorized user.

4. The method of claim 1, wherein the information further comprises a location and media type of the software and data, and a name of the software.

* * * * *